United States Patent

Ahmed

[11] Patent Number: 5,582,045
[45] Date of Patent: Dec. 10, 1996

[54] ANTI-THEFT DEVICE FOR ATTACHMENT TO A STEERING WHEEL IN A MOTOR VEHICLE

[76] Inventor: Sayeed Ahmed, 3401 Avenue J, apt. 4D, Brooklyn, N.Y. 11210

[21] Appl. No.: 527,777

[22] Filed: Sep. 13, 1995

[51] Int. Cl.$^6$ .................................................. B60R 25/02
[52] U.S. Cl. .................. 70/209; 70/226; 70/238
[58] Field of Search ....................... 70/209, 211, 212, 70/225, 226, 237, 238

[56] References Cited

U.S. PATENT DOCUMENTS

| | | | |
|---|---|---|---|
| 4,103,524 | 8/1978 | Mitchell et al. | |
| 4,730,470 | 3/1988 | Zane et al. | 70/211 |
| 4,738,127 | 4/1988 | Johnson | |
| 5,033,281 | 7/1991 | Kofman et al. | 70/209 |
| 5,157,951 | 10/1992 | Chen et al. | 70/209 |
| 5,165,264 | 11/1992 | Chen | |
| 5,211,041 | 5/1993 | Hsa | |
| 5,333,478 | 8/1994 | Chuang | 70/209 |
| 5,363,679 | 11/1994 | Prasad | 70/209 |
| 5,426,960 | 6/1995 | Jan | 70/209 |
| 5,460,021 | 10/1995 | Taylor | 70/209 |
| 5,471,855 | 12/1995 | Wu | 70/209 |

FOREIGN PATENT DOCUMENTS

| | | | |
|---|---|---|---|
| 631708 | 6/1936 | Germany | 70/209 |

Primary Examiner—Darnell M. Boucher
Attorney, Agent, or Firm—Michael I. Kroll

[57] ABSTRACT

An anti-theft device (16) for attachment to a steering wheel (18) in a motor vehicle (20) comprising a stationary member (22) having an open side socket (24) on a first end to allow pivoting therein. A structure (26) on a second end of the stationary member (22) is for engaging with a first segment (28) of the steering wheel (18) from the inside. An element (30) extends longitudinally from the first segment engaging structure (26), for preventing clockwise rotation of the steering wheel (18). A first movable member (32) is provided. A component (34) on a first end of the first movable member (32) is for pivoting within the socket (24). A structure (36) on a second end of the first movable member (32) is for engaging with a second segment (38) of the steering wheel (18) from the inside opposite from the first segment (28) of the steering wheel (18). A second movable member (40) is also provided. A component (42) on a first end of the second movable member (40), is for pivoting within the socket (24). An element (44) extends longitudinally from a second end of the second movable member (40), for preventing counterclockwise rotation of the steering wheel (18). A facility (46) within the stationary member (22) is for preventing the second pivoting component (40) to pivot in the socket (24), thereby maintaining the first segment engaging structure (26) and the second segment engaging structure (36) in position on the steering wheel (18).

19 Claims, 4 Drawing Sheets

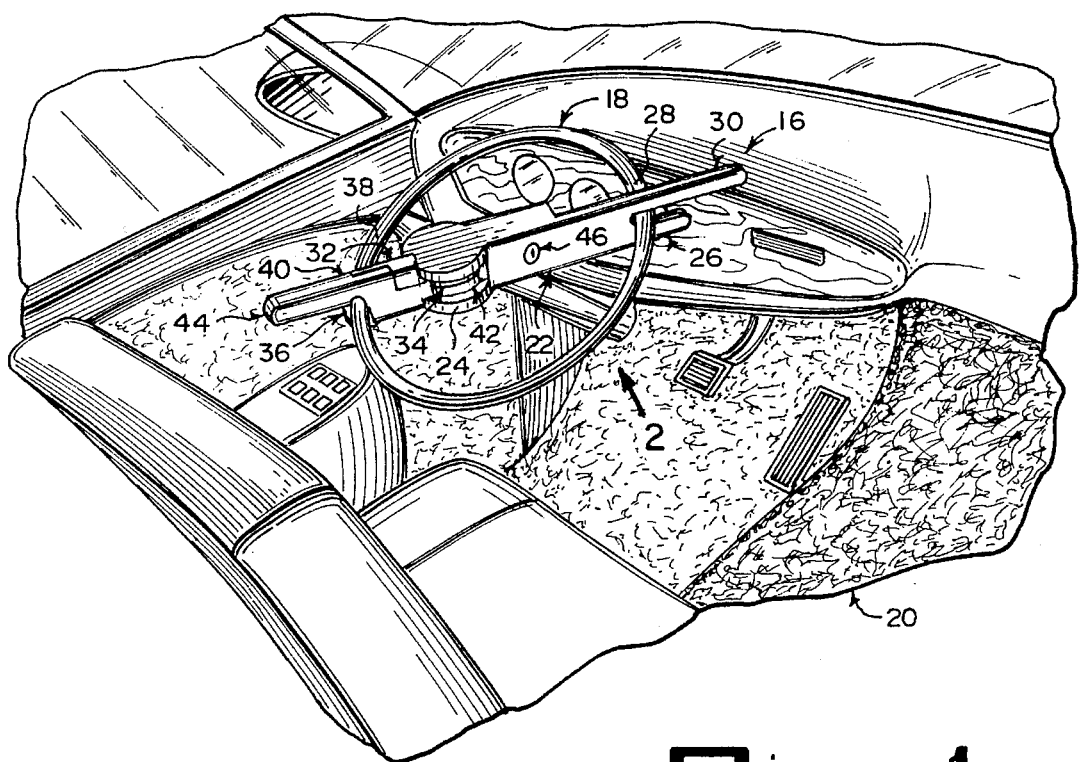
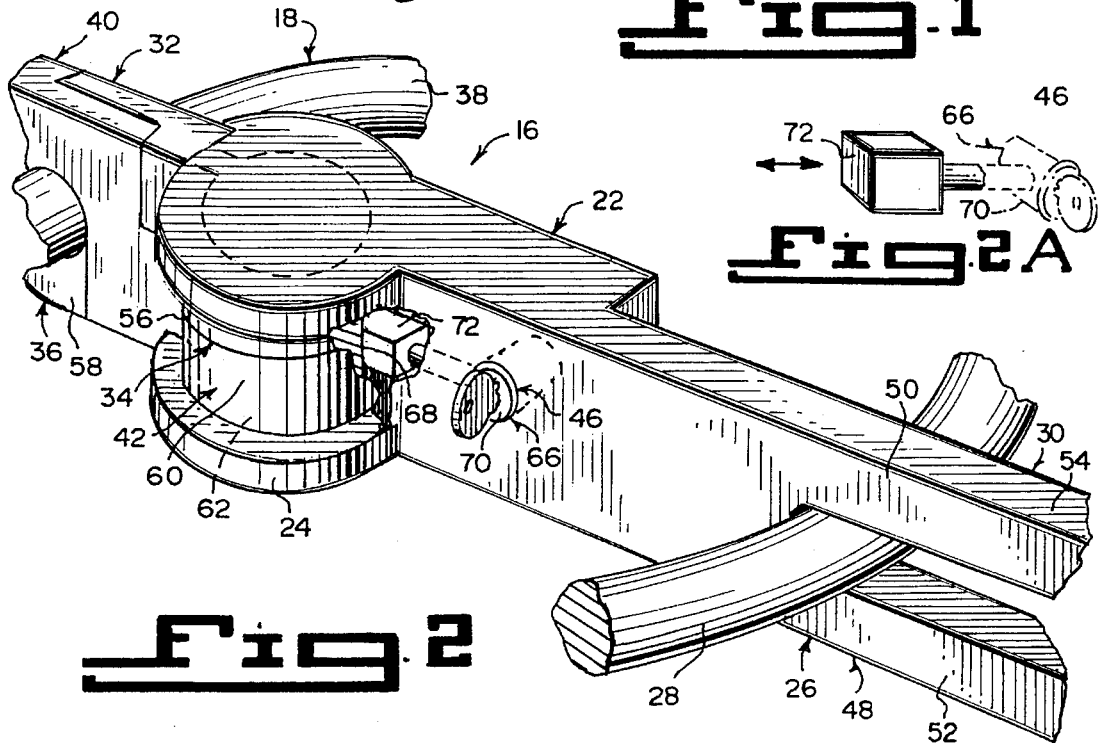

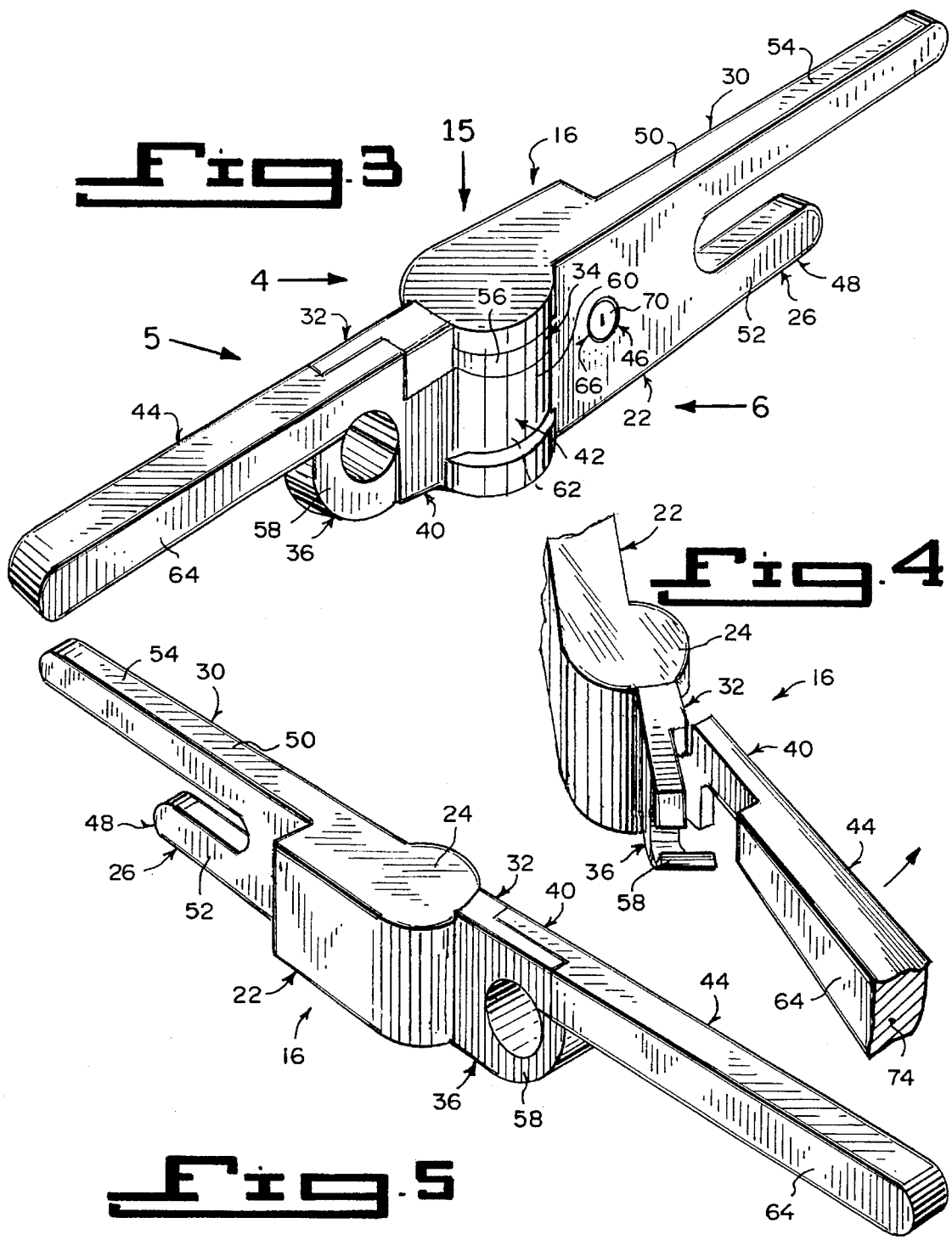

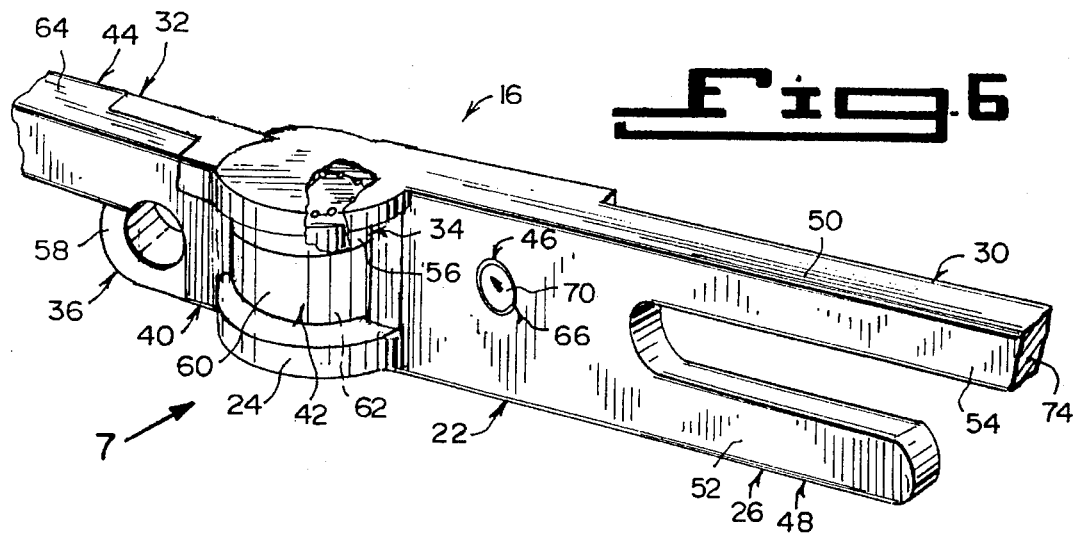
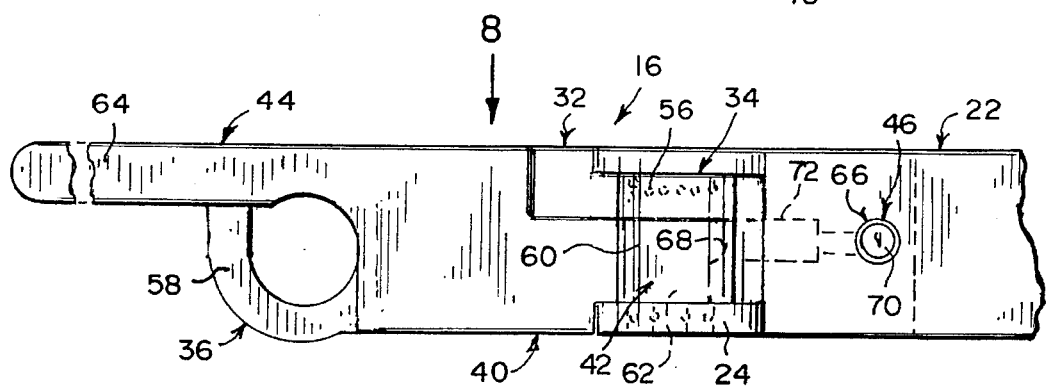
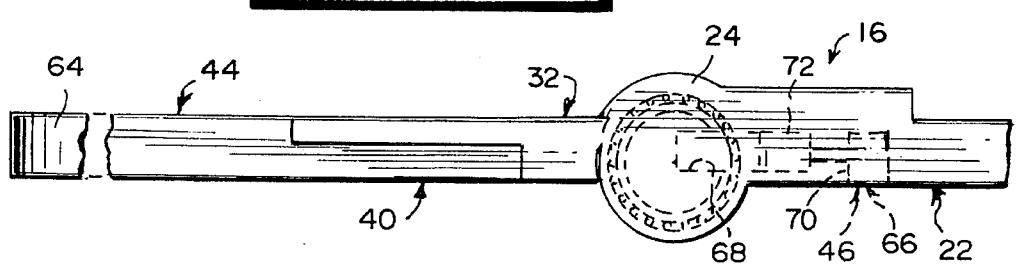
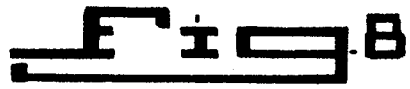

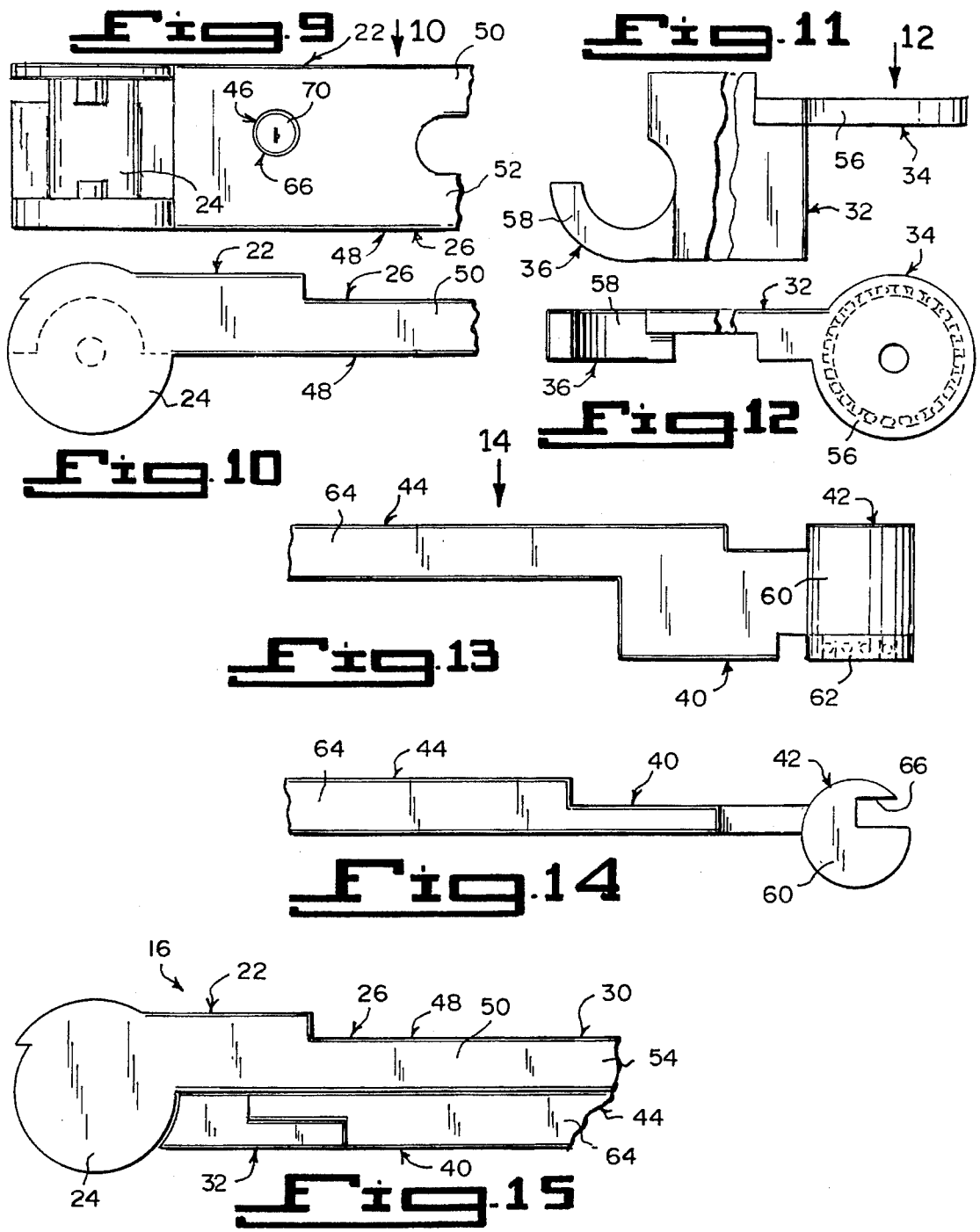

5,582,045

ANTI-THEFT DEVICE FOR ATTACHMENT TO A STEERING WHEEL IN A MOTOR VEHICLE

BACKGROUND OF THE INVENTION

1. Field of the Invention

The instant invention relates generally to steering wheel locks and more specifically it relates to an anti-theft device for attachment to a steering wheel in a motor vehicle.

2. Description of the Prior Art

Numerous steering wheel locks have been provided in prior art. For example, U.S. Pat. Nos. 4,103,524 to Mitchell et al.; 4,738,127 to Johnson; 5,165,264 to Chen and 5,211,041 to Hse all are illustrative of such prior art. While these units may be suitable for the particular purpose to which they address, they would not be as suitable for the purposes of the present invention as heretofore described.

U.S. Pat. No. 4,103,524:

A theftproof automobile steering wheel lock comprising a rigid bar adapted to be attached diametrically to the steering wheel. One end of the rigid bar is at least extending beyond the rim of the steering wheel a sufficient distance. Rotation of the steering wheel in either direction is limited by engagement of the protruding end with an interior portion of the vehicle or operator.

U.S. Pat. No. 4,738,127:

An antitheft device for attachment to a steering wheel of an automobile comprising an elongated body member having a passage extending along an axis therethrough. A first hook means is secured to the body member for engagement with a portion of the steering wheel. The first hook means engages the steering wheel from the inside thereof with the body member extending outward beyond the periphery of the steering wheel. An elongated rod member is adapted to move in a telescopic fashion in the passage of the body member along the axis. A second hook means is secured to the rod member for engaging the inside portion of the steering wheel diametrically opposed to the first hook means. A means associated with the body member engages the rod member within the passage for locking the rod member stationary with respect to the body member at any of a plurality of positions.

U.S. Pat. No. 5,165,264:

A telescopic lock device is used for locking a steering wheel in an automobile and includes an elongated tubular lock body, a central rod secured coaxially in the lock body and a telescopic tube slideable axially between the lock body and the central rod. When a key is inserted into the key driven unit of the lock body, the rotation of the key can move a movable element into the central bore of the lock body to engage in a selected one of a row of axially aligned notches in the telescopic tube so as to lock the telescopic tube on the lock body. The lock body and the telescopic tube has a forked paw portion which rides on the rim of the steering wheel, so as to retain the telescopic lock device on the steering wheel.

U.S. Pat. No. 5,211,041:

An automobile steering lock has a tubular member with a central passageway for a hexagonal rod member to telescope freely therein. A first hook is secured to the tubular member and a second hook is secured to the rod member for engagement with opposite portions of a steering wheel. A locking member has an oval actuator extending from a key hole body to fit in a round hole in a flat body of a locating means to push up and down. The locating means has two parallel feet with V-shaped ends to engage two of many grooves provided in the rod ember to lock it within the tubular member at a variety of positions.

SUMMARY OF THE INVENTION

A primary object of the present invention is to provide an anti-theft device for attachment to a steering wheel in a motor vehicle that will overcome the shortcomings of the prior art devices.

Another object is to provide an anti-theft device for attachment to a steering wheel in a motor vehicle that will prevent complete rotation of the steering wheel, so that an unauthorized person cannot operate the motor vehicle.

An additional object is to provide an anti-theft device for attachment to a steering wheel in a motor vehicle that will not damage the steering wheel when installed quickly thereon without the use of special tools.

A further object is to provide an anti-theft device for attachment to a steering wheel in a motor vehicle that is simple and easy to use.

A still further object is to provide an anti-theft device for attachment to a steering wheel in a motor vehicle that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 1 is a perspective view of an interior portion of a motor vehicle, showing the instant invention installed onto a steering wheel.

FIG. 2 is an enlarged front perspective view taken in the direction of arrow 2 in FIG. 1, with parts broken away and in section.

FIG. 2A is a perspective view showing the bolt lever in greater detail connected to the lock mechanism in phantom.

FIG. 3 is an enlarged front perspective view of the instant invention per se in its locked position.

FIG. 4 is a rear perspective view taken in the direction of arrow 4 in FIG. 3, with parts broken away showing the second movable member slightly moved away from the first movable member.

FIG. 5 is a rear perspective view taken in the direction of arrow 5 in FIG. 3.

FIG. 6 is a front perspective view with parts broken away taken in the direction of arrow 6 in FIG. 3.

FIG. 7 is a front view with parts broken away taken in the direction of arrow 7 in FIG. 6.

FIG. 8 is a top view taken in the direction of arrow 8 in FIG. 7.

FIG. 9 is a front view of the stationary member with parts broken away.

FIG. 10 is a top view taken in the direction of arrow 10 in FIG. 9.

FIG. 11 is a front view of the first movable member with parts broken away.

FIG. 12 is a top view taken in the direction of arrow 12 in FIG. 11.

FIG. 13 is a front view of the second movable member with parts broken away.

FIG. 14 is a top view taken in the direction of arrow 14 in FIG. 13.

FIG. 15 is a top view taken in the direction of arrow 15 in FIG. 3, with parts broken away showing the first movable member and the second movable member pivoted into a stored position against the stationary member when not in use.

Similar reference characters denote corresponding features consistently throughout the attached drawings.

DETAILED DESCRIPTION OF THE PREFERRED EMBODIMENTS

Turning now descriptively to the drawings, in which similar reference characters denote similar elements throughout the several views, FIGS. 1 through 15 illustrate an anti-theft device 16 for attachment to a steering wheel 18 in a motor vehicle 20, comprising a stationary member 22 having an open side socket 24 on a first end to allow pivoting therein. A structure 26 on a second end of the stationary member 22 is for engaging with a first segment 28 of the steering wheel 18 from the inside. An element 30 extends longitudinally from the first segment engaging structure 26, for preventing clockwise rotation of the steering wheel 18.

A first movable member 32 is provided. A component 34 on a first end of the first movable member 32, is for pivoting within the socket 24. A structure 26 on a second end of the first movable member 32, is for engaging with a second segment 38 of the steering wheel 18 from the inside opposite from the first segment 28 of the steering wheel 18.

A second movable member 40 is also provided. A component 42 on a first end of the second movable member 40, is for pivoting within the socket 24. An element 44 extends longitudinally from a second end of the second movable member 40, for preventing counterclockwise rotation of the steering wheel 18. A facility 46 within the stationary member 22, is for preventing the second component 42 to pivot in the socket 24, thereby maintaining the first segment engaging structure 26 and the second segment engaging structure 36 in position on the steering wheel 18.

The first segment engaging structure 26 is a fork 48 having two spaced apart parallel horizontal prongs 50, 52 extending from the second end of the stationary member 22. The prongs 50, 52 fit above and below the first segment 28 of the steering wheel 18. The clockwise rotation preventing element 30 is a long extension arm 54 integral with and extending from the upper prong 52 of the fork 48.

The first pivoting component 34 is an upper bearing unit 56 integral with and extending from the first end of the first movable member 32, that fits in a rotatable manner into the socket 24. The second segment engaging structure 36 is a hook 58 extending from the second end of the first movable member 32. The hook 58 will fit onto the second segment 38 of the steering wheel 18.

The second pivoting component 42 is a pivot joint 60 with a lower bearing unit 62 integral with and extending from the first end of the second movable member 40, that fits in a rotatable manner into the socket 24 below the upper bearing unit 56. The counterclockwise rotation preventing element 44 is an elongated bar 64 integral with and extending from the second end of the second movable member 40 over the second segment engaging structure 36.

The pivot preventing facility 46 is a lock assembly 66. The lock assembly 66 consists of the pivot joint 60 having a vertical slot 68 therein. A key operated cylinder lock 70 is mounted within the stationary member 22 adjacent the socket 24. An enlarged bolt lever 72 is operable by the key operated cylinder lock 70, which can enter in the vertical slot 68 to prevent pivoting of the pivot joint 60 with the lower bearing unit 62 and the upper bearing unit 56. The enlarged bolt lever 72 can exit the vertical slot 68, to allow pivoting of the pivot joint 60 with the lower bearing unit 62 and the upper bearing unit 56.

The first movable member 32 and the second movable member 40 are inter-engaged with each other. When the enlarged bolt lever 72 enters the vertical slot 68 in the pivot joint 60 of the second movable member 40, it will prevent both the first movable member 32 and the second movable member 40 from pivoting about the socket 24. The anti-theft device 16 is fabricated out of a durable strong metal material 74, to reduce tampering of the device 16 when attached to the steering wheel 18.

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An anti-theft device for attachment to a steering wheel in a motor vehicle comprising:
   a) a stationary member having an open side socket on a first end to allow pivoting therein;
   b) means on a second end of said stationary member, for engaging with a first segment of the steering wheel from the inside;
   c) means extending longitudinally from said first segment engaging means, for preventing clockwise rotation of the steering wheel;
   d) a first movable member;
   e) first means on a first end of said first movable member, for pivoting within said socket;
   f) means on a second end of said first movable member, for engaging with a second segment of the steering wheel from the inside opposite from the first segment of the steering wheel;

g) a second movable member;

h) second means on a first end of said second movable member, for pivoting within said socket;

i) means extending longitudinally from a second end of said second movable member, for preventing counter-clockwise rotation of the steering wheel; and j) means within said stationary member, for preventing said second pivoting means to pivot in said socket, thereby maintaining said first segment engaging means and said second segment engaging means in position on the steering wheel.

2. An anti-theft device as recited in claim 1, wherein said first segment engaging means is a fork having two spaced apart parallel horizontal prongs extending from the second end of said stationary member, whereby said prongs fit above and below the first segment of the steering wheel.

3. An anti-theft device as recited in claim 2, wherein said clockwise rotation preventing means is a long extension arm integral with and extending from said upper prong of said fork.

4. An anti-theft device as recited in claim 1, wherein said first pivoting means is an upper bearing unit integral with and extending from the first end of said first movable member that fits in a rotatable manner into said socket.

5. An anti-theft device as recited in claim 1, wherein said second segment engaging means is a hook extending from the second end of said first movable member, whereby said hook will fit onto the second segment of the steering wheel.

6. An anti-theft device as recited in claim 4, wherein said second pivoting means is a pivot joint with a lower bearing unit integral with and extending from the first end of said second movable member that fits in a rotatable manner into said socket below said upper bearing unit.

7. An anti-theft device as recited in claim 1, wherein said counterclockwise rotation preventing means is an elongated bar integral with and extending from the second end of said second movable member over said second segment engaging means.

8. An anti-theft device as recited in claim 6, wherein said pivot preventing means is a lock assembly.

9. An anti-theft device as recited in claim 8, wherein said lock assembly includes:

a) said pivot joint having a vertical slot therein;

b) a key operated cylinder lock mounted within said stationary member adjacent said socket; and c) an enlarged bolt lever operable by said key operated cylinder lock which can enter in said vertical slot to prevent pivoting of said pivot joint with said lower bearing unit and said upper bearing unit, and can exit said vertical slot to allow pivoting of said pivot joint with said lower bearing unit and said upper bearing unit.

10. An anti-theft device as recited in claim 9, wherein said first movable member and said second movable member are inter-engaged with each other, so that when said enlarged bolt lever enters said vertical slot in said pivot joint of said second movable member, it will prevent both said first movable member and said second movable member from pivoting about said socket.

11. An anti-theft device as recited in claim 1, wherein said device is fabricated out of a durable strong metal material, to reduce tampering of said device when attached to the steering wheel.

12. An anti-theft device as recited in claim 3, wherein said first pivoting means is an upper bearing unit integral with and extending from the first end of said first movable member that fits in a rotatable manner into said socket.

13. An anti-theft device as recited in claim 12, wherein said second segment engaging means is a hook extending from the second end of said first movable member, whereby said hook will fit onto the second segment of the steering wheel.

14. An anti-theft device as recited in claim 13, wherein said second pivoting means is a pivot joint with a lower bearing unit integral with and extending from the first end of said second movable member that fits in a rotatable manner into said socket below said upper bearing unit.

15. An anti-theft device as recited in claim 14, wherein said counterclockwise rotation preventing means is an elongated bar integral with and extending from the second end of said second movable member over said second segment engaging means.

16. An anti-theft device as recited in claim 15, wherein said pivot preventing means is a lock assembly.

17. An anti-theft device as recited in claim 16, wherein said lock assembly includes:

a) said pivot joint having a vertical slot therein;

b) a key operated cylinder lock mounted within said stationary member adjacent said socket; and c) an enlarged bolt lever operable by said key operated cylinder lock which can enter in said vertical slot to prevent pivoting of said pivot joint with said lower bearing unit and said upper bearing unit, and can exit said vertical slot to allow pivoting of said pivot joint with said lower bearing unit and said upper bearing unit.

18. An anti-theft device as recited in claim 17, wherein said first movable member and said second movable member are inter-engaged with each other, so that when said enlarged bolt lever enters said vertical slot in said pivot joint of said second movable member, it will prevent both said first movable member and said second movable member from pivoting about said socket.

19. An anti-theft device as recited in claim 18, wherein said device is fabricated out of a durable strong metal material, to reduce tampering of said device when attached to the steering wheel.

* * * * *